(12) United States Patent
Terrenoire et al.

(10) Patent No.: US 8,314,178 B2
(45) Date of Patent: Nov. 20, 2012

(54) POLYMER DISPERSIONS CONTAINING HIGHLY BRANCHED POLYCARBONATES

(75) Inventors: Alexandre Terrenoire, Mannheim (DE); Daniel Schoenfelder, Mannheim (DE); Bernd Bruchmann, Freinsheim (DE); Sebastian Roller, Mannheim (DE); Harm Wiese, Laudenbach (DE); Bernhard Schuler, Mannheim (DE); Hermann Seyffer, Heidelberg (DE); Marc Schroeder, Canton, MI (US)

(73) Assignee: BASF SE, Ludwigshafen (DE)

( * ) Notice: Subject to any disclaimer, the term of this patent is extended or adjusted under 35 U.S.C. 154(b) by 462 days.

(21) Appl. No.: 12/518,896

(22) PCT Filed: Dec. 14, 2007

(86) PCT No.: PCT/EP2007/064004
§ 371 (c)(1),
(2), (4) Date: Jun. 12, 2009

(87) PCT Pub. No.: WO2008/071801
PCT Pub. Date: Jun. 19, 2008

(65) Prior Publication Data
US 2010/0035065 A1 Feb. 11, 2010

(30) Foreign Application Priority Data

Dec. 15, 2006 (EP) .................................. 06126273
Nov. 19, 2007 (EP) .................................. 07121032
Nov. 19, 2007 (EP) .................................. 07121033
Nov. 19, 2007 (EP) .................................. 07121034

(51) Int. Cl.
*C09B 67/00* (2006.01)
*B32B 27/36* (2006.01)
(52) U.S. Cl. ........................ 524/502; 428/412
(58) Field of Classification Search ............. 524/502
See application file for complete search history.

(56) References Cited

U.S. PATENT DOCUMENTS

| | | | |
|---|---|---|---|
| 4,923,920 A * | 5/1990 | Scholl et al. ............... | 524/501 |
| 7,521,521 B2 * | 4/2009 | Bruchmann et al. ......... | 528/196 |
| 7,649,074 B2 | 1/2010 | Bruchmann et al. | |
| 7,786,240 B2 | 8/2010 | Bruchmann et al. | |
| 7,837,829 B2 | 11/2010 | Gaschler et al. | |
| 7,847,004 B2 | 12/2010 | Wiese | |
| 2006/0122321 A1 * | 6/2006 | Bouillo et al. ............. | 524/700 |
| 2007/0037957 A1 | 2/2007 | Bruchmann et al. | |
| 2008/0139712 A1 | 6/2008 | Scherzer et al. | |
| 2008/0139715 A1 | 6/2008 | Scherzer et al. | |
| 2008/0153931 A1 | 6/2008 | Bruchmann et al. | |
| 2008/0167419 A1 | 7/2008 | Eipper et al. | |
| 2008/0167430 A1 | 7/2008 | Bruchmann et al. | |
| 2008/0207812 A1 | 8/2008 | Mettlach et al. | |
| 2008/0211135 A1 | 9/2008 | Eipper et al. | |
| 2008/0214701 A1 | 9/2008 | Wilms et al. | |
| 2008/0245259 A1 | 10/2008 | Chowdhry et al. | |
| 2008/0262133 A1 | 10/2008 | Eibeck et al. | |
| 2008/0312384 A1 | 12/2008 | Bruchmann et al. | |
| 2009/0041813 A1 | 2/2009 | Bouillo et al. | |
| 2009/0093589 A1 | 4/2009 | Bruchmann et al. | |
| 2009/0099319 A1 | 4/2009 | Stumbe et al. | |
| 2009/0156736 A1 | 6/2009 | Fischer et al. | |
| 2009/0209701 A1 | 8/2009 | Steinmetz et al. | |
| 2009/0214795 A1 | 8/2009 | Jokisch et al. | |
| 2009/0233110 A1 | 9/2009 | Seyffer et al. | |
| 2009/0281274 A1 | 11/2009 | Bruchmann et al. | |
| 2009/0317626 A1 | 12/2009 | Tiarks et al. | |
| 2009/0318607 A1 | 12/2009 | Schutte et al. | |
| 2010/0021754 A1 | 1/2010 | Schlichting et al. | |
| 2010/0028582 A1 | 2/2010 | Joch et al. | |
| 2010/0036008 A1 | 2/2010 | Bruchmann et al. | |
| 2010/0036041 A1 | 2/2010 | Schroder et al. | |
| 2010/0048813 A1 | 2/2010 | Clauss et al. | |
| 2010/0063171 A1 | 3/2010 | Roschmann et al. | |
| 2010/0173144 A1 | 7/2010 | Schuette et al. | |
| 2010/0222539 A1 | 9/2010 | Bruchmann et al. | |
| 2010/0249369 A1 | 9/2010 | Bruchmann et al. | |
| 2011/0023333 A1 | 2/2011 | Schutte et al. | |
| 2011/0028603 A1 | 2/2011 | Peretolchin et al. | |

FOREIGN PATENT DOCUMENTS

| | | |
|---|---|---|
| DE | 10 2005 009 166 | 8/2006 |
| EP | 0 297 395 | 1/1989 |
| JP | 08-12925 | 1/1996 |
| WO | 00 29495 | 5/2000 |
| WO | 01 96411 | 12/2001 |
| WO | 02 48459 | 6/2002 |
| WO | 2004 016700 | 2/2004 |
| WO | 2004 016701 | 2/2004 |
| WO | 2004 037928 | 5/2004 |
| WO | 2005 003186 | 1/2005 |
| WO | 2005 026234 | 3/2005 |

OTHER PUBLICATIONS

U.S. Appl. No. 12/996,306, filed Dec. 3, 2010, Bette, et al.
U.S. Appl. No. 12/741,244, filed May 4, 2010, Roller, et al.
U.S. Appl. No. 12/743,436, filed May 18, 2010, Terrenoire, et al.
U.S. Appl. No. 12/922,983, filed Sep. 16, 2010, Terrenoire, et al.
Office Action issued Jun. 7, 2012 in Japanese patent application No. 2009-540788, (English translation only).

* cited by examiner

*Primary Examiner* — Hui Chin
(74) *Attorney, Agent, or Firm* — Oblon, Spivak, McClelland, Maier & Neustadt, L.L.P.

(57) ABSTRACT

The present invention relates to polymer dispersions which comprise highly branched polycarbonates, to a process for preparing them, and to their use.

17 Claims, No Drawings

POLYMER DISPERSIONS CONTAINING HIGHLY BRANCHED POLYCARBONATES

The present invention relates to polymer dispersions which comprise highly branched polycarbonates, to a process for preparing them, and to their use.

Aqueous polymer dispersions which form polymer films when the aqueous dispersion medium is evaporated have become widespread. They serve, for example, as binders which are of interest, for example, for paints, or as materials for the coating of leather, paper or polymeric films. The solid, particulate or powdery polymer compositions that are obtainable from such aqueous dispersions by drying serve, furthermore, as additives for a large multitude of fields of application. Polymer dispersions and the emulsion polymers they comprise are used, for example, for papermaking, as base materials for adhesives, for producing membranes, as binders or auxiliarys for leather and textiles, in the nonwovens sector, in detergents and cleaning products, in the building sector, for modifying plastics, in hydraulically setting compositions, as components for toner formulations, as additives in electrophotographic applications, etc.

Consequently there has been no lack of attempts to make suitable additions in order to improve these polymer dispersions or to optimize them for specific fields of application. In many cases, however, these additions have the disadvantage of still exhibiting a certain volatility, which has an adverse effect, for example, on the VOC of the coatings obtained from them.

There continues to be a need for aqueous polymer dispersions which have a very high solids content in conjunction with a very low viscosity. Such dispersions are especially suitable for producing paper coating slips, a low viscosity being desirable in terms of the processability, especially. A higher solids content, moreover, has the advantage that on drying there is less water to be removed and it is therefore possible to save on energy costs. Furthermore, the performance properties of the coated paper, such as its resistance to mechanical loads, and more particularly the pick resistance, and also its visual appearance, smoothness and gloss for example, and printability are to be extremely good.

WO 02/48459 discloses paper coating slips whose viscosity is lowered by addition of highly crosslinked polyesteramides.

WO 00/29495 describes a coating material which comprises a solvent, an alkyd resin (polyester resin), and a star polymer. The star polymers in such materials serve as modifiers for improving the performance properties of the coating materials, such as for achieving a lower viscosity, for example. They derive from polyfunctional thiols which contain at least three vinylically unsaturated side chains.

WO 01/96411 describes amphiphilic star polymers which have a mercaptan-based core from which there proceed at least three polymer arms, and also describes the use of these star polymers to stabilize aqueous polymer dispersions.

WO 2004/016700 describes a water-based copolymer dispersion which is obtainable by copolymerization using at least one dendritic polymer which is functionalized with alkylene groups. The resulting copolymer dispersions are notable for improved blocking properties.

WO 2004/016701 describes an aqueous homopolymer or copolymer dispersion, obtainable by means of emulsion polymerization, where an alkenyl-functionalized dendrimer is used as an addition. The composition may be used as a binder for coatings.

WO 2004/037928 describes an air-drying aqueous resin composition composed of a fatty acid-functionalized hyperbranched polymer which dries in the air, a nonamphiphilic alkyd resin, a dryer, and a stabilizer.

WO 2005/003186 describes a process for preparing aqueous polymer dispersions based on copolymers which comprise in copolymerized form at least one hydrophobic allyl, vinyl, maleic or diene monomer, the polymerization taking place in the presence of at least one dendritic polymer. The dendritic polymer in this system enables the use even of strongly hydrophobic monomers having a water solubility of less than 0.001 g/l for the emulsion polymerization. The use of dendritic polycarbonates as an addition to polymer dispersions is not described.

WO 2005/026234 describes high-functionality, highly branched or hyperbranched polycarbonates and also their preparation, and for the production of printing inks. Use in polymer dispersions is not described.

It is an object of the present invention to provide an aqueous polymer dispersion having improved performance properties. They ought in particular to exhibit a low viscosity and/or a high solids content.

Surprisingly it has been found that this object is achieved through the use of highly branched polycarbonates in aqueous polymer dispersions.

The invention first provides, accordingly, an aqueous polymer dispersion Pd) comprising:
 an emulsion polymer of at least one $\alpha,\beta$-ethylenically unsaturated monomer M) and
 at least one highly branched polycarbonate.

The invention further provides a process for preparing an aqueous polymer dispersion Pd) by free-radical emulsion polymerization of at least one monomer M), where at least one highly branched polycarbonate is added before and/or during and/or after the emulsion polymerization. Addition after the emulsion polymerization also comprises addition as part of the process of formulating a product which comprises an emulsion polymer based on at least one $\alpha,\beta$-ethylenically unsaturated monomer M). For this purpose it is possible for at least one highly branched polycarbonate as defined below to be added as an additive to a coating material or to a paper coating slip, for example.

Additionally provided by the invention are methods of modifying the performance properties of an aqueous polymer dispersion Pd), and also the use of at least one aqueous polymer dispersion Pd) as a binder in coating materials and paper coating slips.

The inventive use of the highly branched polycarbonates is accompanied by at least one of the following advantages:
 high compatibility of the highly branched polycarbonates employed with a multiplicity of dispersions,
 possibility of reducing the viscosity relative to aqueous polymer dispersions without addition of highly branched polycarbonates,
 possibility of preparing aqueous polymer dispersions with increased solids content relative to dispersions prepared without the addition of highly branched polycarbonates,
 possibility of controlling the glass transition temperature, $T_G$, of the emulsion polymers present in the aqueous polymer dispersions Pd), on addition before and/or during the emulsion polymerization,
 possibility of reducing the minimum film formation temperature MFFT, more particularly on addition after the emulsion polymerization,
 at least partial avoidance of additives that increase the VOC content of the dispersions.

Used in accordance with the invention to prepare the polymer dispersions are highly branched polycarbonates. The expression "highly branched polycarbonates" refers for the purposes of this invention, quite generally, to polycarbonates which are distinguished by a strongly branched structure and a high functionality. For the general definition of highly branched polymers, reference is also made to P. J. Flory, J. Am. Chem. Soc. 1952, 74, 2718, and H. Frey et al., Chem. Eur. J. 2000, 6, No. 14, 2499 (where they are referred to, in deviation from the definition chosen here, as "hyperbranched polymers").

The highly branched polycarbonates in the sense of the invention include star polymers, dendrimers, arborols, and highly branched polycarbonates different therefrom, such as, specifically, hyperbranched polycarbonates.

Star polymers are polymers in which three or more chains extend from a center. This center may be a single atom or a group of atoms.

Dendrimers derive structurally from the star polymers, but with star branching in each of the individual chains. Dendrimers are formed starting from small molecules by means of a continually repeating reaction sequence resulting in ever higher numbers of branches, at whose ends there are in each case functional groups which, in turn, are a starting point for further branches. Hence the number of monomer end groups grows exponentially with each reaction step, ultimately resulting in a tree structure which in the ideal case is spherical. A characteristic feature of the dendrimers is the number of reaction stages (generations) carried out for the purpose of their synthesis. On the basis of their uniform construction (in the ideal case, all of the branches comprise exactly the same number of monomer units), dendrimers are substantially monodisperse, i.e., they generally have a defined molar mass.

Both molecularly and structurally uniform highly branched polymers will also be referred to in common below as dendrimers.

"Hyperbranched polymers" in the context of this invention are highly branched polymers which, in contradistinction to the abovementioned dendrimers, are both molecularly and structurally nonuniform. They have side chains and/or side branches which differ in length and branching, and also a molar mass distribution (polydispersity).

The highly branched polycarbonates used in accordance with the invention preferably have a degree of branching (DB) per molecule of 10% to 100%, more preferably 10% to 90%, and more particularly 10% to 80%. The degree of branching, DB, is defined as DB (%)=(T+Z)/(T+Z+L)×100, where T is the average number of terminally attached monomer units, Z is the average number of branch-forming monomer units, L is the average number of linearly attached monomer units.

Dendrimers generally have a degree of branching DB of at least 99%, especially 99.9% to 100%.

Hyperbranched polycarbonates preferably have a degree of branching DB of 10% to 95%, more preferably 25% to 90%, and more particularly 30% to 80%.

In order to achieve advantageous performance properties it is possible to use not only the structurally and molecularly uniform polycarbonate dendrimers but also hyperbranched polycarbonates. Hyperbranched polycarbonates, however, are generally easier and hence more economic to prepare than polycarbonate dendrimers. Thus, for example, the preparation of the monodisperse dendrimers is complicated by the fact that, at each linking step, protective groups are introduced and have to be removed again, and, before the beginning of each new growth stage, intense cleaning operations are needed, which is why dendrimers can typically be prepared only on a laboratory scale. Hyperbranched polycarbonates, with their molecular weight distribution, can specifically, advantageously, have the viscosity properties of the dispersions that are modified with them. Hyperbranched polycarbonates, moreover, have a more flexible structure than the dendrimers.

The term "polycarbonate" for the purposes of the invention also embraces compounds which as well as carbonate groups contain further functional groups, such as poly(estercarbonates), poly(ethercarbonates), poly(etherestercarbonates), etc.

Preferred polycarbonates are those which have a weight-average molecular weight $M_w$ in the range from about 500 to 500 000, preferably 750 to 200 000, more particularly 1000 to 100 000. The molar mass can be determined by gel permeation chromatography with a standard, such as polymethyl methacrylate.

To modify the performance properties it is preferred to add the highly branched polycarbonate to the polymer dispersion Pd) in an amount of 0.1% to 30%, more preferably of 0.5% to 20%, more particularly of 1.0% to 10%, by weight, based on the weight fraction of the emulsion polymer.

The addition of the highly branched polycarbonate may take place before and/or in and/or after the free-radical emulsion polymerization for the preparation of Pd). Specific embodiments, including those relating to the deliberate influencing of certain performance properties, are described below.

One specific embodiment concerns the use of highly branched polycarbonates which have a weight-average particle diameter of less than 150 nm, more preferably less than 100 nm, and very preferably less than 80 nm. Preferably the weight-average particle diameter is greater than 0.5 nm, more preferably greater than 1 nm, more particularly greater than 1.5 nm, and especially greater than 2 nm.

In the context of the present invention the expression "alkyl" encompasses straight-chain and branched alkyl groups. Suitable short-chain alkyl groups are, for example, straight-chain or branched $C_1$-$C_7$ alkyl, preferably $C_1$-$C_6$ alkyl, and more preferably $C_1$-$C_4$ alkyl groups. They include more particularly methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain $C_8$-$C_{30}$ alkyl groups are straight-chain or branched alkyl groups. They are preferably predominantly linear alkyl radicals, of the kind also occurring in natural or synthetic fatty acids and fatty alcohols and also oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, etc. The expression "alkyl" encompasses unsubstituted and substituted alkyl radicals.

The above remarks for alkyl also apply to the alkyl moieties in arylalkyl. Preferred arylalkyl radicals are benzyl and phenylethyl.

$C_8$-$C_{32}$ alkenyl in the context of the present invention stands for straight-chain and branched alkenyl groups, which may be singly, doubly or multiply unsaturated. Preference is given to $C_{10}$-$C_{20}$ alkenyl. The expression "alkenyl" encompasses unsubstituted and substituted alkenyl radicals. The radicals in question are, especially, predominantly linear alkenyl radicals, of the kind which also occur in natural or synthetic fatty acids and fatty alcohols and also oxo-process alcohols. They include more particularly octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, eleostearyl, and oleyl (9-octadecenyl).

The expression "alkylene" in the sense of the present invention stands for straight-chain or branched alkanediyl groups having 1 to 7 carbon atoms, such as methylene, 1,2-ethylene, 1,3-propylene, etc.

Cycloalkyl stands preferably for $C_4$-$C_8$ cycloalkyl, such as cyclobutyl, cyclopentyl, cyclohexyl, cycloheptyl or cyclooctyl.

The expression "aryl" encompasses for the purposes of the present invention monocyclic or polycyclic aromatic hydrocarbon radicals which may be unsubstituted or substituted. The expression "aryl" stands preferably for phenyl, tolyl, xylyl, mesityl, duryl, naphthyl, fluorenyl, anthracenyl, phenanthrenyl or naphthyl, more preferably for phenyl or naphthyl, it being possible for these aryl groups, in the case of substitution, to carry generally 1, 2, 3, 4 or 5, preferably 1, 2 or 3, substituents.

Suitability for the synthesis of hyperbranched polymers suitable for use in the process of the invention is possessed more particularly by what are called $AB_x$ monomers. These monomers have two different functional groups, A and B, which are able to react with one another to form a link. The functional group A is present only once per molecule, and the functional group B two or more times (e.g., $AB_2$ or $AB_3$ monomers). The $AB_x$ monomers may be incorporated fully in the form of branches into the hyperbranched polymer; they may be incorporated as terminal groups, thus still having x free B groups; and they may be incorporated as linear groups having (x−1) free B groups. The hyperbranched polymers obtained have a greater or lesser number of B groups, either terminally or as side groups, depending on the degree of polymerization. Further details are found, for example, in Journal of Molecular Science, Rev. Macromol. Chem. Phys., C37(3), 555-579 (1997).

In addition to the carbonate groups that result during the synthesis of the hyperbranched structure, the hyperbranched polycarbonates used in accordance with the invention preferably contain at least four further functional groups. The maximum number of these functional groups is generally not critical. In many cases, however, it is not more than 500. The fraction of functional groups is preferably 4 to 100, especially 5 to 80, and more especially 6 to 50.

The further terminal functional groups of the hyperbranched polymers used in accordance with the invention are selected for example, independently of one another, from —OC(=O)OR, —COOH, —COOR, —CONH$_2$, —CONHR, —OH, —NH$_2$, —NHR, and —SO$_3$H. Hyperbranched polymers terminated by OH, COOH and/or ROC (=O)O groups have proven particularly advantageous.

Hyperbranched polycarbonates that are suitable can be prepared, for example, by a) reacting at least one organic carbonate (A) of the general formula $R^aOC(=O)OR^b$ with at least one aliphatic alcohol (B) which contains at least 3 OH groups, with elimination of alcohols $R^aOH$ and $R^bOH$, to give one or more condensation products (K), $R^a$ and $R^b$ each being selected independently of one another from straight-chain or branched alkyl, arylalkyl, cycloalkyl, and aryl radicals, and it also being possible for $R^a$ and $R^b$, together with the group —OC(=O)O— to which they are attached, to be a cyclic carbonate, b) intermolecularly reacting the condensation products (K) to give a high-functionality, hyperbranched polycarbonate, the proportion of the OH groups to the carbonates in the reaction mixture being chosen such that the condensation products (K) contain on average either one carbonate group and more than one OH group, or one OH group and more than one carbonate group. The radicals $R^a$ and $R^b$ may have identical or different definitions. In one specific version $R^a$ and $R^b$ have the same definitions. Preferably $R^a$ and $R^b$ are selected from $C_1$-$C_{20}$ alkyl, $C_5$-$C_7$ cycloalkyl, $C_6$-$C_{10}$ aryl, and $C_6$-$C_{10}$ aryl-$C_1$-$C_{20}$ alkyl, as defined above. $R^a$ and $R^b$ can also together be $C_2$-$C_6$ alkylene. With particular preference $R^a$ and $R^b$ are selected from straight-chain and branched $C_1$-$C_5$ alkyl, as defined above.

Dialkyl or diaryl carbonates can be prepared, for example, from the reaction of aliphatic, araliphatic or aromatic alcohols, preferably monoalcohols, with phosgene. Furthermore, they can also be prepared via oxidative carbonylation of the alcohols or phenols by means of CO in the presence of noble metals, oxygen or $NO_x$. Regarding preparation methods of diaryl or dialkyl carbonates, see also Ullmann's Encyclopedia of Industrial Chemistry, 6th Edition, 2000 Electronic Release, Wiley-VCH.

Examples of suitable carbonates encompass aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, and didodecyl carbonate.

Preference is given to using aliphatic carbonates, more particularly those in which the radicals comprise 1 to 5 C atoms, such as dimethyl carbonate, diethyl carbonate, dipropyl carbonate, dibutyl carbonate or diisobutyl carbonate, for example.

The organic carbonates are reacted with at least one aliphatic alcohol (B) which contains at least three OH groups, or with mixtures of two or more different alcohols.

Examples of compounds having at least three OH groups are glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane), di(pentaerythritol), di-, tri- or oligoglycerols, or sugars, such as glucose, polyetherols that have a functionality of three or more and are based on alcohols with a functionality of three or more and ethylene oxide, propylene oxide or butylene oxide, or polyesterols. Particular preference is given to glycerol, trimethylolethane, trimethylolpropane, 1,2,4-butanetriol, pentaerythritol, and also their polyetherols based on ethylene oxide or propylene oxide.

These polyfunctional alcohols can also be used in a mixture with difunctional alcohols (B'), with the proviso that the average OH functionality of all of the alcohols used is together more than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, and difunctional polyetherols or polyesterols.

The reaction of the carbonate with the alcohol or alcohol mixture to give the high-functional hyperbranched polycarbonate used according to the invention takes place with elimination of the monofunctional alcohol or phenol from the carbonate molecule.

The high-functionality hyperbranched polycarbonates formed by the process outlined are terminated after the reaction, i.e., without further modification, with hydroxyl groups and/or with carbonate groups. They dissolve readily in various solvents, as for example in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

By a high-functionality polycarbonate is meant in the context of this invention a product which besides the carbonate groups which form the polymer backbone has terminally or pendently in addition at least four, preferably at least eight functional groups. The functional groups are carbonate groups and/or OH groups. In principle there is no upper limit on the number of terminal or pendent functional groups; however, products having a very high number of functional groups may exhibit unwanted properties, such as high viscosity or poor solubility, for example. The high-functionality polycarbonates of the present invention generally have no more than 500 terminal or pendent functional groups, preferably not more than 100, and more particularly not more than 50 terminal or pendent functional groups.

For the preparation of the high-functionality polycarbonates it is necessary to set the ratio of the OH-comprising compounds to the carbonate such that the resultant simplest condensation product (called condensation product (K) below) comprises on average either one carbonate group and more than one OH group or one OH group and more than one carbonate group. The simplest structure of the condensation product (K) of a carbonate (A) and a dialcohol or polyalcohol (B) produces the arrangement $XY_n$ or $YX_n$, X being a carbonate group, Y a hydroxyl group and n generally an integer between 1 and 6, preferably between 1 and 4, more preferably between 1 and 3. The reactive group, which results as a single group, is referred to below as "focal group".

Where, for example, in the preparation of the simplest condensation product (K) from a carbonate and a dihydric alcohol, the reaction ratio is 1:1, then the result on average is a molecule of type XY, illustrated by the general formula 1.

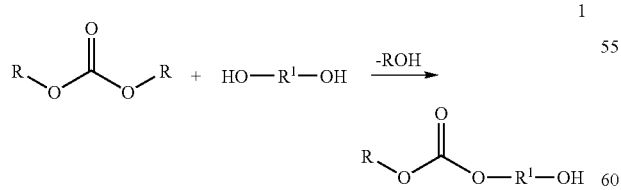

In the preparation of the condensation product (K) from a carbonate and a trihydric alcohol with a reaction ratio of 1:1, the result on average is a molecule of type $XY_2$, illustrated by the general formula 2. The focal group here is a carbonate group.

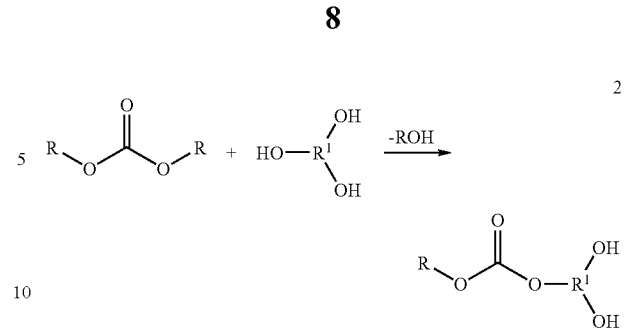

In the preparation of the condensation product (K) from a carbonate and a tetrahydric alcohol, again with the reaction ratio 1:1, the result on average is a molecule of type $XY_3$, illustrated by the general formula 3. The focal group here is a carbonate group.

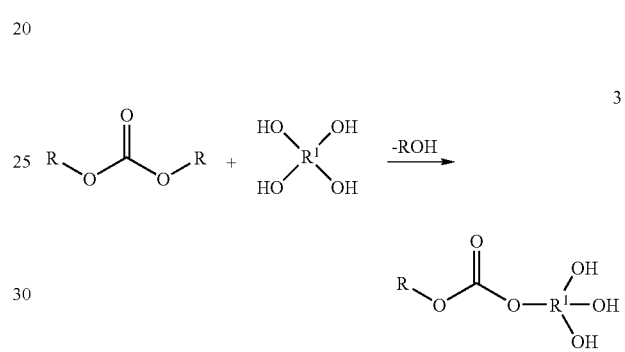

In formulae 1 to 3, R has the definition defined at the outset and $R^1$ stands for an aliphatic radical.

The condensation product (K) can also be prepared, for example, from a carbonate and a trihydric alcohol, illustrated by the general formula 4, where the reaction ratio on a molar basis is 2:1. Here the result on average is a molecule of type $X_2Y$, the focal group here being an OH group. In the formula 4, R and $R^1$ have the same definition as in the formulae 1 to 3.

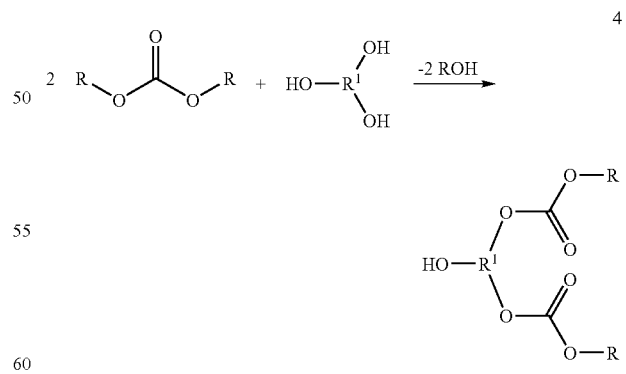

Where the difunctional compounds, e.g. a dicarbonate or a diol, are additionally added to the components, this produces an extension of the chains, as illustrated, for example, in the general formula 5. The result again is on average a molecule of type $XY_2$, the focal group being a carbonate group.

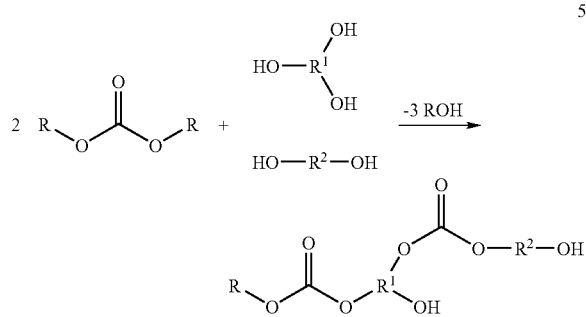

In formula 5, $R^2$ is an organic, preferably aliphatic radical, R and $R^1$ are defined as described above.

The simple condensation products (K), described by way of example in formulae 1 to 5, react in accordance with the invention preferably intermolecularly to form high-functionality polycondensation products, called polycondensation products (P) below. The reaction to give the condensation product (K) and to give the polycondensation product (P) takes place usually at a temperature of 0 to 250° C., preferably at 60 to 160° C., in bulk or in solution. In this context it is possible generally to use any solvents which are inert toward the respective reactants. Preference is given to using organic solvents, such as, for example, decane, dodecane, benzene, toluene, chlorobenzene, xylene, dimethylformamide, dimethylacetamide or solvent naphtha.

In one preferred embodiment the condensation reaction is carried out in bulk. The monofunctional alcohol ROH or the phenol which is liberated during the reaction can be removed from the reaction equilibrium in order to accelerate the reaction, such removal taking place by distillative means, if appropriate under reduced pressure.

If distillative removal is intended, it is advisable as a general rule to use carbonates which during the reaction give off alcohols ROH having a boiling point of less than 140° C.

To accelerate the reaction it is also possible to add catalysts or catalyst mixtures. Suitable catalysts are compounds which catalyze esterification or transesterification reactions, examples being alkali metal hydroxides, alkali metal carbonates, alkali metal hydrogen carbonates, preferably of sodium, of potassium or of cesium, tertiary amines, guanidines, ammonium compounds, phosphonium compounds, organoaluminum, organotin, organozinc, organotitanium, organozirconium or organobismuth compounds, and also catalysts of the kind known as double metal cyanide (DMC) catalysts, as described, for example, in DE 10138216 or in DE 10147712.

Preference is given to using potassium hydroxide, potassium carbonate, potassium hydrogen carbonate, diazabicyclooctane (DABCO), diazabicyclononene (DBN), diazabicycloundecene (DBU), imidazoles, such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate, or mixtures thereof.

The catalyst is generally added in an amount of 50 to 10 000 ppm by weight, preferably of 100 to 5000 ppm by weight, based on the amount of alcohol or alcohol mixture employed.

Furthermore it is also possible, either by adding the appropriate catalyst and/or by choosing a suitable temperature, to control the intermolecular polycondensation reaction. In addition the average molecular weight of the polymer (P) can be adjusted via the composition of the starting components and via the residence time.

The condensation products (K) and the polycondensation products (P), which have been prepared at an elevated temperature, are stable at room temperature usually for a relatively long period of time.

In view of the nature of the condensation products (K) it is possible that the condensation reaction may result in polycondensation products (P) having different structures, with branches but no crosslinks. Furthermore, the polycondensation products (P) ideally contain either a carbonate focal group and more than two OH groups, or else an OH focal group and more than two carbonate groups. The number of reactive groups depends on the nature of the condensation products (K) employed and on the degree of polycondensation.

For example, a condensation product (K) according to the general formula 2 may react by triple intermolecular condensation to form two different polycondensation products (P), which are shown in the general formulae 6 and 7.

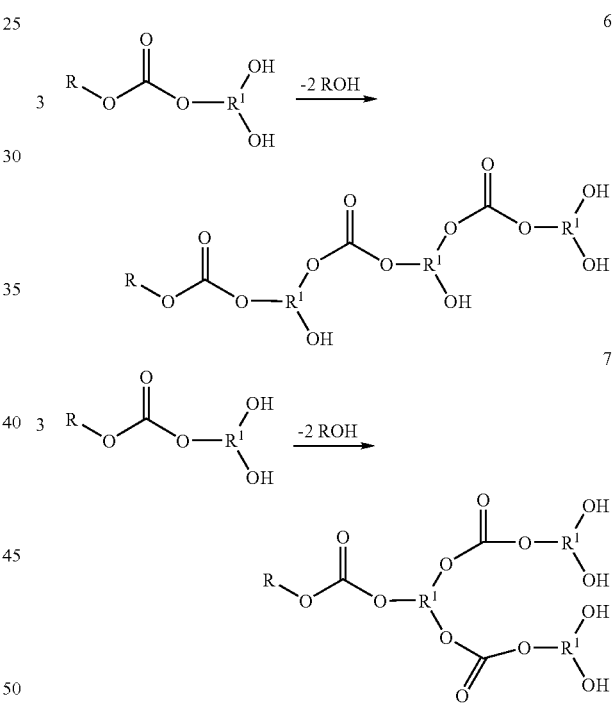

In formula 6 and 7, R and $R^1$ are as defined above.

To terminate the intermolecular polycondensation reaction there are a variety of possibilities. By way of example the temperature can be lowered to a range in which the reaction comes to a standstill and the product (K) or the polycondensation product (P) is stable on storage.

In a further embodiment, as soon as the intermolecular reaction of the condensation product (K) gives a polycondensation product (P) having the desired degree of polycondensation, the reaction can be arrested by adding to the product (P) a product having groups that are reactive toward the focal group of (P). For instance, in the case of a carbonate focal group, a mono-, di- or polyamine, for example, can be added. In the case of a hydroxyl focal group, the product (P) can have added to it, for example, a mono-, di- or polyisocyanate, a compound comprising epoxide groups, or an acid derivative which is reactive with OH groups.

The high-functionality polycarbonates of the invention are generally prepared in a pressure range from 0.1 mbar to 20 bar, preferably 1 mbar to 5 bar, in reactors or reactor cascades which are operated batchwise, semibatchwise or continuously.

As a result of the aforementioned setting of the reaction conditions and, if appropriate, as a result of the choice of suitable solvent, the products can be processed further following preparation, without additional purification.

In a further preferred embodiment the polycarbonates may obtain not only the functional groups already obtained by virtue of the reaction but also further functional groups. Functionalization can in this case take place during the buildup of molecular weight or else subsequently, i.e., after the end of the actual polycondensation.

If, before or during the buildup of molecular weight, components are added which besides hydroxyl or carbonate groups possess further functional groups or functional elements, then a polycarbonate polymer is obtained which has randomly distributed functionalities different from the carbonate and hydroxyl groups.

Effects of this kind can be achieved for example by adding, during the polycondensation, compounds which in addition to hydroxyl or carbonate groups carry further functional groups or functional elements, such as mercapto groups, primary, secondary or tertiary amino groups, ether groups, carboxylic acid derivatives, sulfonic acid derivatives, phosphonic acid derivatives, aryl radicals or long-chain alkyl radicals. For modification by means of carbamate groups it is possible for example to use ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

For modification with mercapto groups it is possible to use mercaptoethanol or thioglycerol, for example. Tertiary amino groups can be generated, for example, by incorporation of N-methyldiethanolamine, N-methyldipropanolamine or N,N-dimethylethanolamine. Ether groups can be generated, for example, by incorporating polyetherols having a functionality of two or more during condensation. Reaction with long-chain alkanediols enables long-chain alkyl radicals to be incorporated; reaction with alkyl or aryl diisocyanates generates polycarbonates containing alkyl, aryl, and urethane groups.

Subsequent functionalization can be obtained by reacting the resultant high-functionality hyperbranched polycarbonate with a suitable functionalizing reagent that is able to react with the polycarbonate's OH and/or carbonate groups.

High-functionality, hyperbranched polycarbonates comprising hydroxyl groups can be modified, for example, by adding molecules comprising acid groups or isocyanate groups. Polycarbonates comprising acid groups, for example, can be obtained by reaction with compounds comprising anhydride groups.

Additionally, high-functionality polycarbonates comprising hydroxyl groups can also be converted into high-functionality polycarbonate-polyetherpolyols by reaction with alkylene oxides-ethylene oxide, propylene oxide or butylene oxide, for example.

A great advantage of the method of the invention lies in its economy. Both the reaction to form a condensation product (K) or polycondensation product (P) and the reaction of (K) or (P) to form polycarbonates with other functional groups or elements can take place in one reaction apparatus, which is an advantage both technically and economically.

Preparation of the Polymer Dispersion Pd)

The polymer dispersion Pd) is prepared using at least one $\alpha,\beta$-ethylenically unsaturated monomer M) which is preferably selected from esters of $\alpha,\beta$-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of $\alpha,\beta$-ethylenically unsaturated monocarboxylic and dicarboxylic acids with $C_2$-$C_{30}$ alkanediols, amides of $\alpha,\beta$-ethylenically unsaturated monocarboxylic and dicarboxylic acids with $C_2$-$C_{30}$ amino alcohols which contain a primary or secondary amino group, primary amides of $\alpha,\beta$-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of $\alpha,\beta$-ethylenically unsaturated monocarboxylic and dicarboxylic acids with amino alcohols, amides of $\alpha,\beta$-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers containing urea groups, and mixtures thereof.

Suitable esters of $\alpha,\beta$-ethylenically unsaturated monocarboxylic and dicarboxylic acids with $C_1$-$C_{20}$ alkanols are methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth) acrylate, arachidyl (meth)acrylate, behenyl (meth)acrylate, lignoceryl (meth)acrylate, cerotinyl (meth)acrylate, melissinyl (meth)acrylate, palmitoleyl (meth)acrylate, oleyl (meth)acrylate, linolyl (meth)acrylate, linolenyl (meth)acrylate, stearyl (meth)acrylate, lauryl (meth)acrylate, and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable ethylenically unsaturated carboxylic acids and sulfonic acids or their derivatives are acrylic acid, methacrylic acid, ethacrylic acid, $\alpha$-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, and 2-acrylamido-2-methylpropanesulfonic acid. Preference is given to, for example, styrenesulfonic acids such as styrene-4-sulfonic acid and styrene-3-sulfonic acid and the alkali metal or alkaline earth metal salts thereof, such as sodium styrene-3-sulfonate and sodium styrene-4-sulfonate, for example. Particularly preferred are acrylic acid, methacrylic acid, and mixtures thereof.

Examples of phosphorous monomers are vinylphosphonic acid and allylphosphonic acid, for example. Also suitable are the monoesters and diesters of phosphonic acid and phosphoric acid with hydroxyalkyl (meth)acrylates, especially the monoesters. Additionally suitable are diesters of phosphonic acid and phosphoric acid that have been esterified once with a hydroxyalkyl (meth)acrylate and also once with a different alcohol, such as an alkanol, for example. Suitable hydroxyalkyl (meth)acrylates for these esters are those specified below as separate monomers, more particularly 2-hydroxyethyl (meth)acrylate, 3-hydroxypropyl (meth)acrylate, 4-hydroxybutyl (meth)acrylate, etc. Corresponding dihydrogen phosphate ester monomers include phosphoalkyl (meth)acrylates, such as 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl (meth)acrylates, phosphodialkyl crotonates and allyl phosphates. Further suitable monomers containing phosphorus groups are described in WO 99/25780 and U.S. Pat. No. 4,733,005, hereby incorporated by reference.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N alkyl and N,N-dialkyl derivatives are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-araquinyl(meth)acrylamide, N-behenyl (meth)acrylamide, N-lignoceryl(meth)acrylamide, N-cerotinyl(meth)acrylamide, N-melissinyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethylacrylate, N,N-dimethylaminopropyl(meth)acrylate, N,N-diethylaminopropyl(meth)acrylate and N,N-dimethylaminocyclohexyl(meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)-butyl]methacrylamide, N-[2-(diethylamino)ethyl]acrylamide, N-[4-(dimethylamino)cyclohexyl]acrylamide, N-[4-(dimethylamino)cyclohexyl]methacrylamide, etc.

Suitable monomers M) are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable monomers M) are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are, for example, ethylene, propylene, isobutylene, isoprene, butadiene, etc.

Suitable polyether (meth)acrylates are compounds of the general formula (A)

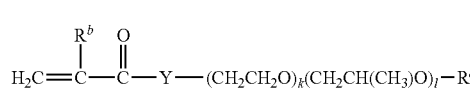

(A)

in which
the sequence of the alkylene oxide units is arbitrary,
k and l independently of one another are an integer from 0 to 100, the sum of k and l being at least 3,
$R^a$ is hydrogen, $C_1$-$C_{30}$ alkyl, $C_5$-$C_8$ cycloalkyl or $C_6$-$C_{14}$ aryl,
$R^b$ is hydrogen or $C_1$-$C_8$ alkyl,
Y is O or $NR^c$, where $R^c$ is hydrogen, $C_1$-$C_{30}$ alkyl or $C_5$-$C_8$ cycloalkyl.

Preferably k is an integer from 3 to 50, more particularly 4 to 25. Preferably l is an integer from 3 to 50, more particularly 4 to 25.

Preferably $R^a$ in the formula (A) is hydrogen, methyl, ethyl, n-propyl, isopropyl, n-butyl, sec-butyl, n-pentyl, n-hexyl, octyl, 2-ethylhexyl, decyl, lauryl, palmityl or stearyl.

Preferably $R^b$ is hydrogen, methyl, ethyl, n-propyl, isopropyl, n-butyl, sec-butyl, tert-butyl, n-pentyl or n-hexyl, more particularly hydrogen, methyl or ethyl. With particular preference $R^b$ is hydrogen or methyl.

Preferably Y in the formula (A) is O.

In one specific embodiment the free-radical emulsion polymerization for the preparation of Pd) is carried out using at least one polyether (meth)acrylate. In that case this polyether (meth)acrylate is used preferably in an amount of up to 25% by weight, more preferably up to 20% by weight, based on the total weight of the monomers M). For the emulsion polymerization it is particularly preferred to use 0.1% to 20% by weight, preferably 1% to 15% by weight, of at least one polyether (meth)acrylate. Examples of suitable polyether (meth)acrylates are the polycondensation products of the aforementioned α,β-ethylenically unsaturated monocarboxylic and/or dicarboxylic acids and their acid chlorides, acid amides, and acid anhydrides with polyetherols. Suitable polyetherols are readily preparable by reaction of ethylene oxide, 1,2-propylene oxide and/or epichlorohydrin with a starter molecule, such as water or a short-chain alcohol $R^a$—OH. The alkylene oxides can be used individually, in alternation in succession or as a mixture. The polyether acrylates can be used alone or in mixtures for preparing the emulsion polymers employed in accordance with the invention.

The polymer dispersion Pd) preferably comprises in copolymerized form at least one polyether (meth)acrylate selected from the compounds of the general formulae I or II or mixtures thereof

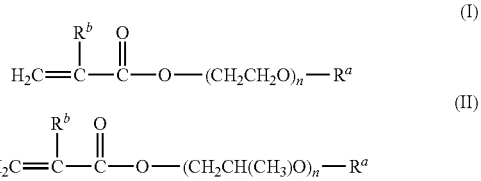

in which n is an integer from 3 to 15, preferably 4 to 12, $R^a$ is hydrogen, $C_1$-$C_{20}$ alkyl, $C_5$-$C_8$ cycloalkyl or $C_6$-$C_{14}$ aryl, $R^b$ is hydrogen or methyl.

Suitable polyether (meth)acrylates are available commercially, in the form for example of various products designated Bisomer® from Laporte Performance Chemicals, UK. They include, for example, Bisomer® MPEG 350 MA, a methoxy-polyethylene glycol monomethacrylate.

According to one further preferred embodiment the free-radical emulsion polymerization for the preparation of Pd) is carried out not using any polyether (meth)acrylate.

In a further specific embodiment the free-radical emulsion polymerization for the preparation of Pd) is carried out using at least one monomer containing urea groups. This urea-functional monomer is used preferably in an amount of up to 25% by weight, more preferably up to 20% by weight, based on the total weight of the monomers M). For the emulsion polymerization it is particularly preferred to use 0.1% to 20% by weight, more particularly 1% to 15% by weight, of at least one monomer containing urea groups. Examples of suitable monomers containing urea groups are N-vinylurea or N-allylurea or derivatives of imidazolidin-2-one. They include N-vinyl- and N-allylimidazolidin-2-one, N-vinyl oxyethylimidazolidin-2-one, N-(2-(meth)acrylamidoethyl)imidazolidin-2-one, N-(2-(meth)acryloxyethyl)imidazolidin-2-one (i.e., 2-ureido (meth)acrylate), N-[2-((meth)acryloxyacetamido)ethyl]imidazolidin-2-one, etc.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureidomethacrylate, UMA).

According to one further preferred embodiment the free-radical emulsion polymerization for the preparation of Pd) is carried out using no monomer containing urea groups.

The aforementioned monomers M) may be used individually, in the form of mixtures within one class of monomer, or in the form of mixtures from different classes of monomer.

For the emulsion polymerization it is preferred to use at least 40%, more preferably at least 60%, and more particularly at least 80%, by weight, based on the total weight of the monomers M), of at least one monomer M1) selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof (principal monomers). Preferably the monomers M1) are used for the emulsion polymerization in an amount of up to 99.9%, more preferably up to 99.5%, more particularly up to 99%, by weight, based on the total weight of the monomers M).

The principal monomers M1) are preferably selected from methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, n-pentyl (meth)acrylate, n-hexyl (meth)acrylate, n-heptyl (meth)acrylate, n-octyl (meth)acrylate, ethylhexyl (meth)acrylate, styrene, 2-methylstyrene, vinyl acetate, acrylonitrile, methacrylonitrile, butadiene, and mixtures thereof.

In addition to at least one principal monomer M1) it is also possible in the free-radical emulsion polymerization for the preparation of Pd) to use at least one further monomer M2), which is generally present in a minority amount (secondary monomers). For the emulsion polymerization it is preferred to use up to 60%, more preferably up to 40%, and more particularly up to 20%, by weight, based on the total weight of the monomers M), of at least one monomer M2) selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl (meth)acrylates, $C_1$-$C_{10}$ hydroxyalkyl(meth)acrylamides, and mixtures thereof. Preferably the monomers M2), when present, are used for the emulsion polymerization in an amount of at least 0.1%, more preferably at least 0.5%, more particularly at least 1%, by weight, based on the total weight of the monomers M).

For the emulsion polymerization it is particularly preferred to use 0.1% to 60%, preferably 0.5% to 40%, more particularly 0.1% to 20%, by weight of at least one monomer M2). The monomers M2) are especially selected from acrylic acid, methacrylic acid, itaconic acid, maleic acid, fumaric acid, maleic anhydride, acrylamide, methacrylamide, 2-hydroxyethyl acrylate, 2-hydroxyethyl methacrylate, 2-hydroxyethylacrylamide, 2-hydroxyethylmethacrylamide, and mixtures thereof.

Particularly suitable monomer combinations for the process of the invention are those set out below:

$C_1$-$C_{10}$ alkyl (meth)acrylates and mixtures thereof, especially
- ethylhexyl acrylate, methyl methacrylate;
- n-butyl acrylate, methyl methacrylate;
- n-butyl acrylate, ethylhexyl acrylate.

Mixtures of at least one $C_1$-$C_{10}$ alkyl (meth)acrylate and at least one vinylaromatic, especially
- n-butyl acrylate, methyl methacrylate, styrene;
- n-butyl acrylate, styrene;
- n-butyl acrylate, ethylhexyl acrylate, styrene;
- ethylhexyl acrylate, styrene;
- ethylhexyl acrylate, methyl methacrylate, styrene.

Mixtures of at least one vinylaromatic and at least one olefin, selected from $C_2$-$C_8$ monoolefins and nonaromatic hydrocarbons having at least two conjugated double bonds, especially
- styrene, butadiene.

The aforementioned particularly suitable monomer combinations may additionally comprise small amounts of further monomers M2). The latter monomers M2) are preferably selected from acrylic acid, methacrylic acid, acrylamide, methacrylamide, and mixtures thereof.

In the preparation of the polymer dispersions of the invention it is possible to use at least one crosslinker in addition to the aforementioned monomers M). Monomers which possess a crosslinking function are compounds having at least two polymerizable, ethylenically unsaturated, nonconjugated double bonds in the molecule. Crosslinking may also take place, for example, by means of functional groups which are able to enter into a chemical crosslinking reaction with complementary functional groups. In that case the complementary groups may both be attached to the emulsion polymer for the crosslinking it is possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, contain at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl (meth)acrylate, acetoacetoxyethyl (meth)acrylate and, more particularly, diacetoneacrylamide. The crosslinkers are preferably a compound with at least two functional groups, more particularly two to five functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

By appropriate additization of the aqueous polymer dispersion Pd) it is also possible additionally to produce surface crosslinking. Such additization includes, for example, the addition of a photoinitiator, or of siccatives. Suitable photoinitiators are those which are excited by sunlight, examples being benzophenone or derivatives thereof. Suitable siccatives are the metal compounds recommended for aqueous alkyd resins, based for example on Co or Mn (overview in U. Poth, Polyester und Alkydharze, Vincentz Network 2005, p. 183 f).

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker).

One specific embodiment relates to polymer dispersions Pd) which comprise no copolymerized crosslinker.

The free-radical polymerization of the monomer mixture M) may take place in the presence of at least one regulator. Regulators are used preferably in an amount of 0.0005% to 5%, more preferably of 0.001% to 2.5%, and more particularly of 0.01% to 1.5% by weight, based on the total weight of the monomers used for the polymerization.

Regulators (polymerization regulators) is a general term for compounds having high transfer constants. Regulators accelerate chain transfer reactions to bring about reduction in the degree of polymerization of the resultant polymers without affecting the overall reaction rate. Regulators may be subdivided into monofunctional, difunctional or polyfunctional regulators, depending on the number of functional groups in the molecule that are able to lead to one or more chain transfer reactions. Suitable regulators are described comprehensively, for example, by K. C. Berger and G. Brandrup in J. Brandrup, E. H. Immergut, Polymer Handbook, 3rd ed., John Wiley & Sons, New York, 1989, p. II/81-II/141.

Examples of suitable regulators include aldehydes such as formaldehyde, acetaldehyde, propionaldehyde, n-butyraldehyde, and isobutyraldehyde.

Other regulators which can also be used are as follows: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether.

As regulators it is preferred to use compounds containing sulfur in bound form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which acquire sulfur in the form of SH groups, also referred to as mercaptans). Preferred regulators are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of difunctional regulators, containing two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butanediol bisthioglycolate. Examples of polyfunctional regulators are compounds which comprise more than two sulfur atoms in bound form. Examples thereof are trifunctional and/or tetrafunctional mercaptans.

All of the stated regulators may be used individually or in combination with one another. One specific embodiment relates to polymer dispersions Pd) which are prepared by free-radical emulsion polymerization without the addition of a regulator.

To prepare the polymers it is possible to polymerize the monomers with the aid of initiators that form free radicals.

As initiators for the free-radical polymerization it is possible to employ the peroxo and/or azo compounds customary for the purpose, examples being alkali metal or ammonium peroxidisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxidicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis (2-amidinopropane) dihydrochloride or 2,2'-azobis(2-methylbutyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing components the compound in question comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixtures—for example, a mixture of sodium salt of hydroxymethanesulfinic acid with sodium disulfite.

The amount of initiators is generally 0.1% to 10% by weight, preferably 0.1% to 5% by weight, based on all of the monomers to be polymerized. It is also possible to use two or more different initiators in the emulsion polymerization.

The preparation of the polymer dispersion Pd) takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyl-triethylammonium chloride or quaternary compounds of N—$C_6$-$C_{20}$ alkylpyridines, -morpholines or -imidazoles, e.g., N-laurylpyridinium chloride.

The amount of emulsifier is generally about 0.01% to 10% by weight, preferably 0.1% to 5% by weight, based on the amount of monomers to be polymerized.

The highly branched polycarbonates used in accordance with the invention are generally dispersible in water. Not dispersible in water, as an exception to this rule, are highly branched polycarbonates which have been subjected to a polymer-analogous reaction with hydrophobic groups. In one specific embodiment the highly branched polycarbonates are suitable for the preparation of a polymer dispersion Pd) without the use of surface-active substances, such as emulsifiers, protective colloids or monomers containing actively dispersing groups.

The polymer dispersions Pd) may additionally be admixed with typical auxiliaries and additives. These include, for example, pH modifiers, reducing agents and bleaches, such as the alkali metal salts of hydroxymethane sulfinic acid (e.g., Rongalit® C from BASF Aktiengesellschaft), complexing agents, deodorants, flavors, odorants, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

The polymerization takes place in general at temperatures in a range from 0 to 150° C., preferably 20 to 100° C., more preferably 30 to 95° C. The polymerization takes place preferably under atmospheric pressure, although a polymerization under elevated pressure is also possible, such as under the autogenous pressure of the components used for the polymerization. In one suitable version the polymerization takes place in the presence of at least one inert gas, such as nitrogen or argon, for example.

The polymerization medium may be composed either of water alone or of mixtures of water and water-miscible liquids such as methanol.

Preferably just water is used. The emulsion polymerization may be carried out either as a batch operation or in the form of a feed process, including staged or gradient procedures. Preference is given to the feed process, in which a portion of the polymerization batch or else a polymer seed is introduced as an initial charge and heated to the polymerization temperature, polymerization is commenced, and then the remainder of the polymerization batch, typically by way of two or more spatially separate feeds, of which one or more comprise the monomers in pure form or in emulsified form, is supplied to the polymerization zone continuously, in stages or under the superimposition of a concentration gradient, with the polymerization being maintained.

The manner in which the initiator is added to the polymerization vessel in the course of the free-radical aqueous emulsion polymerization is known to a person of ordinary skill in the art. It can be included in its entirety in the initial charge to the polymerization vessel, or else employed in stages or continuously in accordance with the rate of its consumption in the course of the free-radical aqueous emulsion polymerization. In each case this will depend, in a manner known per se to a person of ordinary skill in the art, both on the chemical nature of the initiator system and on the polymerization temperature. Preferably a portion is included in the initial charge and the remainder is supplied to the polymerization zone in accordance with the rate of its consumption.

The dispersions that are formed in the polymerization may be subjected, following the polymerizing operation, to a physical or chemical aftertreatment. Examples of such techniques are the known techniques for residual monomer reduction, such as aftertreatment by addition of polymerization initiators or mixtures of two or more polymerization initiators at suitable temperatures; aftertreatment of the polymer solution by means of water vapor or ammonia vapor; or stripping with inert gas; or treatment of the reaction mixture with oxidizing or reducing reagents; adsorption techniques such as the adsorption of impurities on selected media such as activated carbon, for example; or an ultrafiltration, for example.

The aqueous polymer dispersion Pd) obtained typically has a solids content of 20% to 70% by weight, preferably 40% to 70% by weight, more preferably 45% to 70% by weight, and with more particular preference of 45% to 65% by weight, based on the polymer dispersion.

The highly branched and especially hyperbranched polycarbonates used in accordance with the invention are notable for high compatibility with a multiplicity of different dispersions.

The highly branched polycarbonates used in accordance with the invention are suitable with advantage for modifying the rheological properties. The invention accordingly further provides a method of modifying the rheological properties of an aqueous polymer dispersion Pd) by adding thereto at least one highly branched polycarbonate. Suitable polycarbonates are those specified above. It is preferred to use at least one hyperbranched polycarbonate.

The addition of at least one highly branched polycarbonate generally leads to a reduction in the viscosity as compared with an aqueous polymer dispersion Pd) without addition of highly branched polycarbonates.

For the modification of the rheological properties, the highly branched polycarbonate can be added after the free-radical emulsion polymerization for the preparation of Pd). Addition in the course of the free-radical emulsion polymerization is also possible. The second version is preferred if, as well as the viscosity, it is also intended to modify a further performance property of Pd). This is especially the case for the preparation of dispersions Pd) with low viscosity and high solids content.

For modifying the rheological properties it is preferred to add the highly branched polycarbonate to the polymer dispersion Pd) in an amount of 0.1% to 30%, more preferably of 0.5% to 20%, more particularly of 1.0% to 10%, by weight, based on the weight fraction of the emulsion polymer. Typical amounts for use of the highly branched polycarbonate are situated, for example, in a range from 1% to 5% by weight, based on the weight fraction of the emulsion polymer in the polymer dispersion Pd).

The viscosity can be determined in accordance with DIN EN ISO 3219 at a temperature of 23° C., using a rotary viscometer.

The highly branched polycarbonates used in accordance with the invention are also suitable with advantage for increasing the solids content. The invention accordingly further provides a process for preparing an aqueous polymer dispersion Pd) with increased solids content, by free-radical emulsion polymerization of at least one monomer M), wherein at least one highly branched polycarbonate is added before and/or during and/or after the emulsion polymerization. Suitable polycarbonates are those specified above. It is preferred to use at least one hyperbranched polycarbonate. With regard to suitable and preferred monomers M) and also to suitable and preferred polymerization conditions, reference is made to the remarks above.

In order to increase the solids content, the highly branched polycarbonate can be added prior to the free-radical emulsion polymerization for the preparation of Pd). Its addition in the course of the free-radical emulsion polymerization is also possible. In that case the highly branched polycarbonate may be added continuously over the entire polymerization time, or over a limited time interval. The addition of the highly branched polycarbonate may also take place in one or more batches.

In order to increase the solids content, the aqueous phase in which the emulsion polymerization is carried out is supplied with preferably more than 50% by weight of the highly branched polycarbonate, more preferably more than 70%, very preferably more than 80%, and more particularly more than 90%, by weight, before 90% by weight of all the monomers which form the emulsion polymer have undergone polymerization.

Generally speaking, 80% to 100% by weight of the highly branched polycarbonates are added after at least 50% by weight of the monomers which form the emulsion polymer have already undergone polymerization.

The amount of the emulsion polymer and of the highly branched polycarbonates in the aqueous polymer dispersion Pd) (solids content) is preferably at least 50%, more preferably at least 55%, more particularly at least 58%, especially at least 60%, more especially at least 65%, by weight, based on the total weight of the aqueous polymer dispersion. The starting materials (monomers and organic polymer particles) can be polymerized in the desired high concentration, the above solids contents of the polymer dispersion being achieved directly.

For the preparation of an aqueous polymer dispersion Pd) with increased solids content it is preferred to add the highly branched polycarbonate to the polymer dispersion Pd) in an amount of 0.1% to 30%, more preferably of 0.5% to 20%, more particularly of 1.0% to 15%, by weight, based on the weight fraction of the emulsion polymer.

To determine the solids content it is possible to dry a defined amount (approximately 5 g) of the aqueous polymer dispersion in a drying oven at 140° C. to constant weight and to re-weigh the solids content.

The highly branched polycarbonates used in accordance with the invention are additionally suitable with advantage for controlling the glass transition temperature, $T_G$, of the emulsion polymers present in the aqueous polymer dispersions Pd). In that case the addition is made preferably before and/or during the emulsion polymerization.

The glass transition temperature can be determined in accordance with DIN 53765 by the DSC (differential scanning calorimetry) method, using, for example, a DSC 822 DSC instrument, series TA 8000, from Mettler-Toledo, Germany.

The highly branched polycarbonates used in accordance with the invention are additionally suitable with advantage for reducing the minimum film formation temperature, MFFT. In that case the addition is made preferably after the emulsion polymerization.

The aqueous polymer dispersions Pd) of the invention which comprise an emulsion polymer and at least one highly branched polycarbonate can be used as they are or as a mixture with further polymers, as a binder composition in aqueous coating materials, such as paint or varnish mixtures, for example. Examples of suitable further polymers are film-forming polymers.

The invention further provides a binder composition which comprises an aqueous polymer dispersion (Pd) as described above or consists of such a polymer dispersion (Pd). This binder composition also comprises the highly branched polycarbonate(s) added to the polymer dispersion (Pd).

In addition to the polymer dispersion (Pd), the binder composition may comprise at least one further film-forming polymer. Included among such are, for example, alkyd resins. Examples of suitable alkyd resins are water-soluble alkyd resins, which preferably have a weight-average molecular weight of 5000 to 40 000. Additionally suitable are alkyd resins having a weight-average molecular weight of more than 40 000, specifically of more than 100 000. An alkyd resin is a polyester which has been esterified with a drying oil, a fatty acid or the like (U. Poth, Polyester und Alkydharze, Vincentz Network 2005).

Suitable water-soluble alkyd resins are alkyd resins of sufficiently high acid number, preferably in the range of 30-65 mg KOH/g. These may if appropriate be in partly or fully neutralized form. The weight-average molecular weight is preferably 8000 to 35 000 and more preferably 10 000 to 35 000.

The use of such further film-forming polymers, especially alkyd resins, which raise the VOC content of the coating materials, is in some circumstances not preferred. One special embodiment is therefore a coating material that comprises at least one dispersion Pd) and at least one highly branched polycarbonate, but no film-forming polymer other than the emulsion polymer present in the polymer dispersion.

The binder compositions of the invention are employed preferably in aqueous coating materials. These coating materials take the form, for example, of an unpigmented system (clear varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: $PVC=(V_P+V_F)\times100/(V_P+V_F+V_B)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| exterior masonry paint, white | about 45-55 |
| clear varnish | 0 |

The invention thus further provides a coating material in the form of an aqueous composition, comprising
  a binder composition as defined above;
  if appropriate, at least one pigment,
  if appropriate, at least one filler,
  if appropriate, further auxiliaries, other than pigments and fillers, and
  water.

A first preferred embodiment is a coating material in the form of a clear varnish which comprises no pigments and fillers.

A second preferred embodiment is a coating material in the form of an emulsion paint.
  Preference is given to a coating material comprising:
  10% to 60% by weight, based on the solids content, of at least one dispersion Pd) as defined above,
  10% to 70% by weight of inorganic fillers and/or inorganic pigments,
  0.1% to 20% by weight of typical auxiliaries, and
  water to 100% by weight.

The fraction of Pd) as a proportion of the above coating material is based on solids, i.e., emulsion polymer and highly branched polycarbonate(s), without water.

Elucidated in the text below is the composition of a typical emulsion paint. Emulsion paints comprise generally 30% to 75%, and preferably 40% to 65%, by weight of nonvolatile constituents. By these are meant all constituents of the preparation which are not water, but at least the total weight of binder, filler, pigment, low-volatility solvents (boiling point above 220° C.), plasticizers for example, and polymeric auxiliaries. This figure is accounted for to the extent of about
a) 3% to 90%, more particularly 10% to 60%, by weight, by the polymer dispersion Pd),
b) 0% to 85%, preferably 5% to 60%, more particularly 10% to 50%, by weight, by at least one inorganic pigment,
c) 0% to 85%, more particularly 5% to 60%, by weight, by inorganic fillers, and
d) 0.1% to 40%, more particularly 0.5% to 20%, by weight, by typical auxiliaries.

The term "pigment" is used in the context of this invention comprehensively to identify all pigments and fillers, examples being color pigments, white pigments, and inorganic fillers. These include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers.

Finely divided fillers may also be used to increase the hiding power and/or to save on the use of white pigments. In order to adjust the hiding power, the hue, and the depth of color, it is preferred to use blends of color pigments and fillers.

The coating material of the invention (aqueous coating material) may comprise further auxiliaries, in addition to the polymer dispersion Pd) having at least one highly branched polycarbonate as an additive, if appropriate, additional film-forming polymers, and pigment/filler.

The typical auxiliaries, in addition to the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Suitable thickeners are, for example, associative thickeners, such as polyurethane thickeners. The amount of the thickener is preferably less than 1% by weight, more preferably less than 0.6% by weight, of thickener, based on the solids content of the coating material.

The coating materials of the invention are produced in a known way by blending the components in mixing apparatus customary for the purpose. It has been found appropriate to prepare an aqueous paste or dispersion from the pigments, water, and, if appropriate, the auxiliaries, and only then to mix the polymeric binder, i.e., in general, the aqueous dispersion of the polymer, with the pigment paste or pigment dispersion.

The coating materials of the invention comprise generally 30% to 75%, and preferably 40% to 65%, by weight of nonvolatile constituents. By these are meant all constituents of the preparation which are not water, but at least the total amount of binder, pigment, and auxiliary, based on the solids content of the coating material. The volatile constituents are primarily water.

Suitable coating materials are highly glossy coating materials. The gloss of the coating material can be determined by DIN 67530. In this case the coating material is applied with slot width of 240 µm to a glass plate and is dried at room temperature for 72 hours. The test specimen is inserted into a calibrated reflectometer, and a determination is made, with a defined angle of incidence, of the extent to which the light returned has been reflected or scattered. The reflectometer value determined as a measure of the gloss (the higher the value, the higher the gloss).

The gloss of high-gloss paints is preferably greater than 60 at 20° and greater than 80 at 60°. The reflectometer value is determined at 23° C. and is reported as a dimensionless parameter as a function of the angle of incidence, e.g., 40 at 20°.

The coating material of the invention may be applied to substrates in a typical way, as for example by spreading, spraying, dipping, rolling, knife coating, etc.

It is used preferably as an architectural coating material, i.e., for coating buildings or parts of buildings. The substrates in question may be mineral substrates such as renders, plaster or plasterboard, masonry or concrete, wood, woodbase materials, metal or paper, wallpaper for example, or plastic, PVC for example.

The coating material is used preferably for internal parts of buildings, such as interior walls, internal doors, paneling, banisters, furniture, etc.

The coating materials of the invention feature ease of handling, good processing properties, and high hiding power. Their pollutant content is low. They have good performance properties, such as high water resistance, good wet adhesion, in particular on alkyd paints, high blocking resistance, good overcoatability, and good flow on application. The equipment used is easily cleaned with water.

Owing to the possibility of reducing viscosity and increasing the solids content, the aqueous polymer dispersion Pd) of the invention with addition of highly branched polycarbonates is also suitable especially for use as binders, in paper coating slips, for example.

Polymer dispersions Pd) of the invention for use in paper coating slips preferably comprise an emulsion polymer comprising in copolymerized form at least one monomer M) or a monomer combination selected from:
$C_1$-$C_{10}$ alkyl (meth)acrylates and mixtures thereof,
mixtures of at least one $C_1$-$C_{10}$ alkyl (meth)acrylate and at least one vinylaromatic, more particularly styrene,
mixtures of at least one vinylaromatic (more particularly styrene) and at least one olefin selected from $C_2$-$C_8$ monoolefins and nonaromatic hydrocarbons having at least two conjugated double bonds (more particularly butadiene).

One specific embodiment of the emulsion polymer are polybutadiene binders which comprise in copolymerized form butadiene and a vinylaromatic, more particularly styrene, and also, if appropriate, at least one further monomer. The weight ratio of butadiene to vinylaromatic is, for example, 10:90 to 90:10, preferably 20:80 to 80:20.

Particularly preferred are polybutadiene binders where the emulsion polymer is composed of at least 40%, preferably at least 60%, more preferably at least 80%, more particularly at least 90%, by weight of hydrocarbons having 2 double bonds, more particularly butadiene, or of mixtures of such hydrocarbons with vinylaromatics, more particularly styrene.

A further specific embodiment of the emulsion polymer are polyacrylate binders which comprise in copolymerized form at least one $C_1$-$C_{10}$ alkyl (meth)acrylate or a mixture of at least one $C_1$-$C_{10}$ alkyl (meth)acrylate and at least one vinylaromatic (more particularly styrene).

Besides the principal monomers it is possible for the emulsion polymers present in the polybutadiene binders and in the polyacrylate binders to comprise further monomers, examples being monomers with carboxylic, sulfonic or phosphonic acid groups. Preference is given to monomers with carboxylic acid groups, examples being acrylic acid, methacrylic acid, itaconic acid, maleic acid or fumaric acid, and aconitic acid. In one preferred embodiment the emulsion polymers comprise in copolymerized form at least one ethylenically unsaturated acid in an amount of 0.05% by weight to 5% by weight, based on the total weight of the monomers employed.

Further monomers are, for example, monomers comprising hydroxyl groups, more particularly $C_1$-$C_{10}$ hydroxyalkyl (meth)acrylates, or amides such as (meth)acrylamide.

Ingredients of paper coating slips include, in particular
a) binder
b) if appropriate a thickener
c) if appropriate, a fluorescent or phosphorescent dye, more particularly as an optical brightener
d) pigments
e) further auxiliaries, examples being flow control additives, or other dyes.

The binder used is the above aqueous polymer dispersion Pd) which comprises the emulsion polymer and the hyperbranched polycarbonates. Further binders, including natural polymers, for example, such as starch, may be used as well. The fraction of the above aqueous polymer dispersion (calculated as solids, i.e., emulsion polymer and highly branched polycarbonates, without water) is preferably at least 50%, more preferably at least 70%, or 100%, by weight, based on the total amount of binder.

The paper coating slips comprise binder preferably in amounts of 1 to 50 parts by weight, more preferably of 5 to 20 parts by weight, of binder, based on 100 parts by weight of pigment.

Suitable thickeners b) include, as well as synthetic polymers, celluloses in particular, preferably carboxymethylcellulose.

The term pigment d) refers here to inorganic solids. These solids, as pigments, are responsible for the color of the paper coating slip (white in particular) and/or merely have the function of an inert filler. The pigment generally comprises white pigments, examples being barium sulfate, calcium carbonate, calcium sulfoaluminate, kaolin, talc, titanium dioxide, zinc oxide, chalk or coating clay or silicates.

The paper coating slip can be produced by customary methods.

The paper coating slips of the invention have a low viscosity and are highly suitable for the coating, for example, of base paper or cardboard. Coating and subsequent drying may take place by typical methods. The coated papers or cardboards have good performance properties, and more particularly can also be printed effectively in the known printing processes, such as flexographic, letterpress, gravure or offset printing. In the offset process in particular they result in high pick resistance and rapid and effective take-up of ink and water. The papers coated with the paper coating slips can be used to good effect in all printing processes, more particularly in the offset process.

The invention further provides for the use of an aqueous polymer dispersion Pd), as defined above, as a base material for adhesives, for producing membranes, as a binder or auxiliary for leather and textiles, in the nonwovens sector, in detergents and cleaning products, in the building sector, for modifying plastics, in hydraulically setting compositions, as components for toner formulations, or as an additive in electrophotographic applications.

The invention is elucidated in more detail with reference to the following, nonlimiting examples.

EXAMPLES

I. Synthesis of Highly Branched Polymers

HBP 1: Hyperbranched Polycarbonate

In a 6 l flask equipped with stirrer, internal thermometer, and reflux condenser, 590.7 g of diethyl carbonate (5.00 mol) and 3350.0 g of a triol (5.00 mol), which was obtained beforehand by ethoxylating trimethylolpropane with 12 ethylene oxide units, were reacted in the presence of potassium carbonate (0.5 g) under atmospheric pressure, with gentle introduction of nitrogen gas, at about 140° C. As a result of the ethanol formed in the course of the reaction, the boiling point of the reaction mixture fell to 120° C. over the course of 4 h. When the boiling temperature remained constant, the reflux condenser was switched for a distillation device, consisting of a 20 cm packed column, a descending condenser, and a receiver, and the ethanol formed during the reaction was distilled off continuously. When a total of about 405 g of ethanol had been removed, corresponding to a total conversion with respect to ethanol of approximately 88%, the reaction mixture was cooled to 100° C. and the potassium carbonate was neutralized by addition of 85% strength phosphoric acid (0.5 g) until a pH of less than 7 had come about. The mixture was stirred at 10° C. for a further 1 h. Then residual monomers and residues of ethanol were removed for 10 min at 140° C. and 40 mbar. Thereafter the product was cooled and analyzed.

The OH number was found to be 146 mg KOH/g, and the molecular weights determined by means of GPC (eluent=DMAC (dimethylacetamide), calibration =PMMA (polymethyl methacrylate)) were $M_n$=2700 g/mol and $M_w$=5500 g/mol. The glass transition temperature was found by means of DSC to be Tg=−56° C.

II. Preparation of Polymer Dispersions

Dispersion D1 (inventive):
Dispersion of acrylic acid, acrylamide, n-butyl acrylate, and methyl methacrylate
  Initial charge: 24.91 g of feed 1
  9.24 g of feed 2
  140.00 g of fully demineralized water
  0.11 g of copper(II) sulfate (0.1%)
  2.75 g of Maranil A 20® (20%) (sodium n-($C_{10}$-$C_{13}$-alkyl) benzene-sulfonate, Cognis)
  Addition 1: 7.22 g of fully demineralized water
  Feed 1: 128.29 g of fully demineralized water
  7.33 g of Dowfax 2A1® (45%) (alkyldiphenyl oxide disulfonate, Dow)
  22.00 g of Lutensol TO 89® (20%) (ethoxylated $C_{13}$ oxo-process alcohol, BASF AG)
  7.15 g of acrylic acid
  16.50 g of acrylamide (50% strength in water)
  308.00 g of n-butyl acrylate
  226.60 g of methyl methacrylate
  Feed 2: 26.40 g of sodium peroxodisulfate (2.5%)
  Feed 3: 12.95 g of fully demineralized water
  16.50 g of hyperbranched polycarbonate HBP 1
  Feed 4: 3.30 g of fully demineralized water
  2.20 g of ammonia (25%)
  Feed 5: 5.01 g of fully demineralized water
  3.30 g of tert-butylhydroperoxide (10%)
  Feed 6: 7.87 g of fully demineralized water
  4.20 g of acetone bisulfite (13.10%)
  Feed 7: 3.68 g of Acticid MBS (5%) (biocide, Thor-Chemie)
  Feed 8: 9.35 g of aqueous sodium hydroxide solution (10%)
  9.79 g of fully demineralized water A polymerization vessel equipped with metering apparatus and temperature regulation was first of all charged with the initial-charge amounts of fully demineralized water, copper (II) sulfate, and Maranil® A20, and this initial charge was heated with stirring to 95° C. Subsequently the initial-charge amount of feed 1 was added and the mixture was stirred for 10 minutes. Thereafter the initial-charge amount of feed 2 was added and polymerization of the initial charge was commenced for 5 minutes. Following the initial polymerization, the remainders of feeds 1 and 2 were metered in over the course of 150 minutes. 10 minutes after the start of feed 1, feed 3 was commenced as well and was metered in over the course of 140 minutes. After the end of feed 1, it was rinsed with addition 1. Polymerization was continued for 15 minutes, during which the temperature in the reaction vessel was adjusted to 90° C. Then, for neutralization, feed 4 was metered in over the course of 15 minutes, followed by the metered introduction of feeds 5 and 6 in parallel over the course of 1 hour, after which stirring was continued for 15 minutes more. Subsequently the reaction batch was allowed to cool to 30° C. over 90 minutes, and, when that temperature was reached, feed 7 was added. Finally, likewise at 30° C., feed 8 was added, after which the reaction batch was cooled to room temperature.

Comparative dispersion CD2 (without hyperbranched polymer):
Dispersion of acrylic acid, acrylamide, n-butyl acrylate, and methyl methacrylate
  Initial charge: 24.98 g of feed 1
  9.24 g of feed 2
  140.00 g of fully demineralized water
  0.11 g of copper(II) sulfate (0.1%)
  2.75 g of Maranil A 20® (20%) (sodium n-($C_{10}$-$C_{13}$-alkyl) benzene-sulfonate, Cognis)
  Addition 1: 7.22 g of fully demineralized water
  Feed 1: 130.24 g of fully demineralized water
  7.33 g of Dowfax 2A1® (45%) (alkyldiphenyl oxide disulfonate, Dow)

22.00 g of Lutensol TO 89® (20%) (ethoxylated $C_{13}$ oxo-process alcohol, BASF AG)
7.15 g of acrylic acid
16.50 g of acrylamide (50% strength in water)
308.00 g of n-butyl acrylate
226.60 g of methyl methacrylate
Feed 2: 26.40 g of sodium peroxodisulfate (2.5%)
Feed 3: 3.30 g of fully demineralized water
2.20 g of ammonia (25%)
Feed 4: 5.01 g of fully demineralized water
3.30 g of tert-butylhydroperoxide (10%)
Feed 5: 7.87 g of fully demineralized water
4.20 g of acetone bisulfite (13.10%)
Feed 6: 3.68 g of Acticid MBS (5%) (biocide, Thor-Chemie)
Feed 7: 9.35 g of aqueous sodium hydroxide solution (10%)
9.79 g of fully demineralized water A polymerization vessel equipped with metering apparatus and temperature regulation was first of all charged with the initial-charge amounts of fully demineralized water, copper (II) sulfate, and Maranil® A20, and this initial charge was heated with stirring to 95° C. Subsequently the initial-charge amount of feed 1 was added and the mixture was stirred for 10 minutes. Thereafter the initial-charge amount of feed 2 was added and polymerization of the initial charge was commenced for 5 minutes. Following the initial polymerization, the remainders of feeds 1 and 2 were metered in over the course of 150 minutes. After the end of feed 1, it was rinsed with addition 1. Polymerization was continued for 15 minutes, during which the temperature in the reaction vessel was adjusted to 90° C. Then, for neutralization, feed 3 was metered in over the course of 15 minutes, followed by the metered introduction of feeds 4 and 5 in parallel over the course of 1 hour, after which stirring was continued for 15 minutes more. Subsequently the reaction batch was allowed to cool to 30° C. over 90 minutes, and, when that temperature was reached, feed 6 was added. Finally, likewise at 30° C., feed 7 was added, after which the reaction batch was cooled to room temperature.

TABLE 1

| Analysis | D1 | CD2 |
|---|---|---|
| pH | 8.1 | 8.5 |
| Coagulum (g) | 5 | 6 |
| Solids content (%) | 60 | 60 |
| LT (%) | 68 | 65 |
| Tg (° C.) | 7 | 9 |
| Viscosity mPa · s | 3980 | 11760 |

The Brookfield viscosity was determined using spindle 6 (D1) and spindle 7 (CD2) at 23° C. The inventive dispersion has a much lower viscosity.

The invention claimed is:

1. An aqueous polymer dispersion comprising:
an emulsion polymer of at least one α,β-ethylenically unsaturated monomer, and
at least one highly branched polycarbonate having a degree of branching of 30% to 95%.

2. The polymer dispersion according to claim 1, comprising as the highly branched polycarbonate at least one hyperbranched polycarbonate.

3. The polymer dispersion according to claim 1, prepared by free-radical emulsion polymerization of at least one α,β-ethylenically unsaturated monomer selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers containing urea groups, and mixtures thereof.

4. The polymer dispersion according to claim 1, wherein emulsion polymerization is carried out using at least 40% by weight of at least one monomer selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof.

5. The polymer dispersion according to claim 4, wherein emulsion polymerization is carried out additionally using up to 60% by weight of at least one monomer selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl (meth)acrylates, $C_1$-$C_{10}$ hydroxyalkyl(meth)acrylamides, and mixtures thereof.

6. A binder composition comprising an aqueous polymer dispersion as defined in claim 1.

7. A coating material comprising
a binder composition as defined in claim 6,
optionally, at least one pigment,
optionally, at least one filler,
optionally, further auxiliaries, and
water.

8. The coating material according to claim 7 in the form of a clear varnish.

9. The coating material according to claim 7 in the form of an emulsion paint.

10. A binder in a coating material comprising the binder composition according to claim 6.

11. A binder in paper coating slips comprising the binder composition according to claim 6.

12. A paper coating slip comprising a binder composition as defined in claim 6.

13. Cardboard or paper coated with a paper coating slip according to claim 12.

14. A base material for adhesives, for producing membranes, as a binder or auxiliary for leather and textiles, in the nonwovens sector, in detergents and cleaning products, in the building sector, for modifying plastics, in hydraulically setting compositions, as components for toner formulations, and as an additive in electrophotographic applications comprising the aqueous polymer dispersion as defined in claim 1.

15. An additive for a product which comprises the polymer dispersion according to claim 3.

16. A coating material, a paper coating slip, a base material for adhesives, as an additive in producing membranes, as an additive for a binder or auxiliary for leather and textiles, a nonwoven, a detergent or cleaning product, as an additive in the building sector, for modifying plastics, in hydraulically setting compositions, for a toner formulation or an electrophotographic composition comprising the additive according to claim 15.

17. The aqueous polymer dispersion according to claim 1, wherein said dispersion has a solids content of 20 to 70 wt %.

* * * * *